Aug. 7, 1962 J. SCHUSTER 3,048,257
CONVEYOR CLEARING DEVICE
Filed Feb. 23, 1960 5 Sheets-Sheet 1

INVENTOR
JANOS SCHUSTER
BY Wendroth, Lind & Ponack
Attys.

Aug. 7, 1962  J. SCHUSTER  3,048,257
CONVEYOR CLEARING DEVICE
Filed Feb. 23, 1960  5 Sheets-Sheet 2

INVENTOR
JANOS SCHUSTER
By
Wenderoth, Lind + Ponack
Attys.

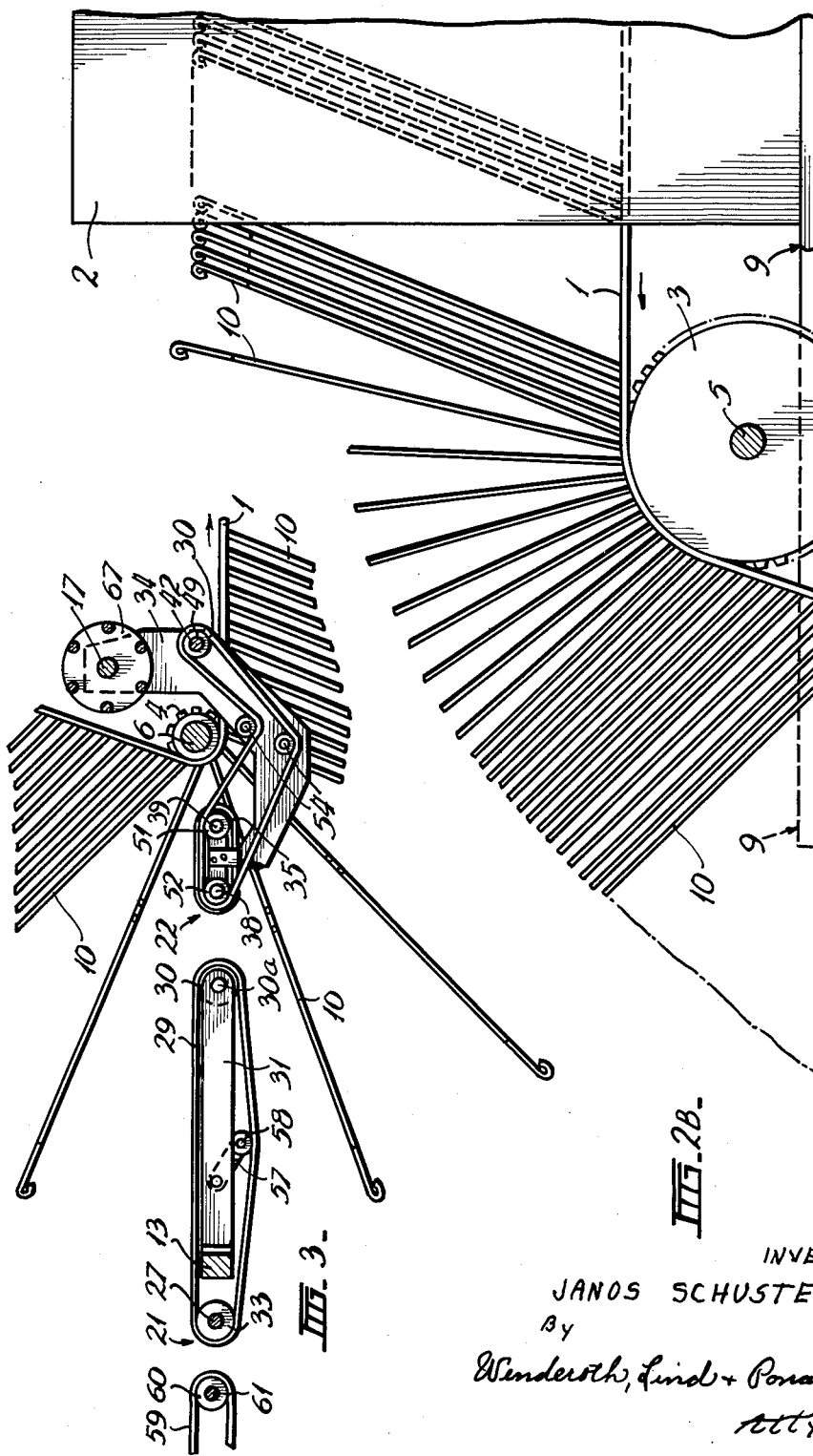

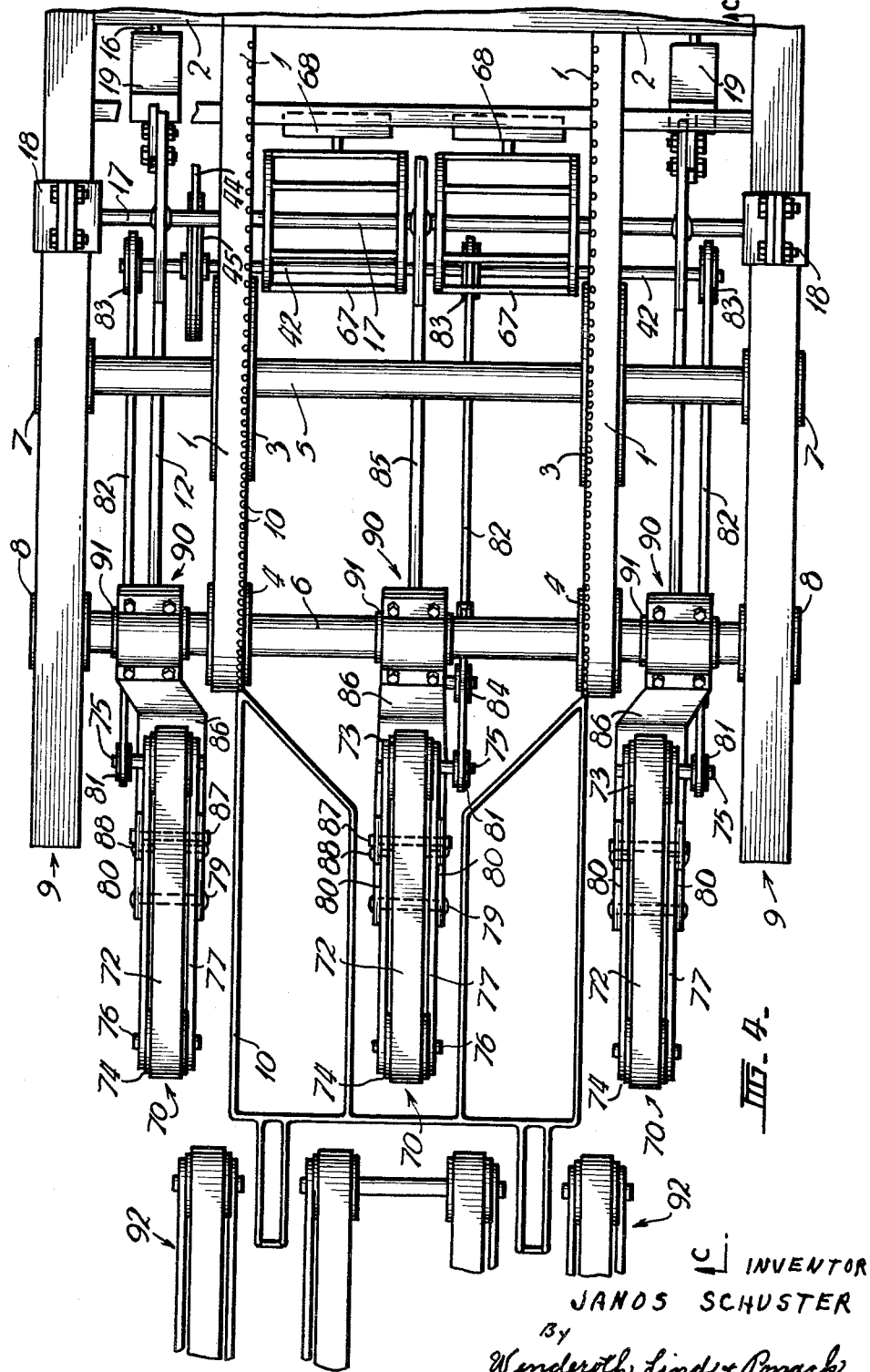

Aug. 7, 1962 — J. SCHUSTER — 3,048,257
CONVEYOR CLEARING DEVICE
Filed Feb. 23, 1960 — 5 Sheets-Sheet 5

INVENTOR
JANOS SCHUSTER
By
Wenderoth, Lind & Ponack
Attys.

3,048,257
CONVEYOR CLEARING DEVICE
Janos Schuster, 6 Geake St., Coburg, Victoria, Australia
Filed Feb. 23, 1960, Ser. No. 10,467
9 Claims. (Cl. 198—20)

This invention relates to a conveyor clearing device which may be used in connection with many known types of conveyors, particularly endless belt or chain conveyors which deliver a succession of articles to a receiving station or to another conveyor.

In many known conveyor systems a succession of articles is carried by an endless belt or chain through a processing stage in which the articles are processed or treated in some desired manner. For example, the articles may be carried through drying, baking, annealing or sterilizing ovens or they may be sprayed, dipped, cleaned or quenched while moving with the conveyor. However, in every case the articles must somehow be removed from the main conveyor, preferably without interrupting its movement. The manner in which the articles are removed depends very largely upon the nature of the articles themselves and upon the way they are carried on the conveyor.

In most cases the articles are deposited or removed from the main conveyor at or by a receiving station fixed relatively to the conveyor and are successively cleared from the receiving station so that a "pile-up" of articles at the station is avoided. Often the receiving station incorporates a conveyor, or is itself the forward end of a conveyor and passes the succession of articles to a stacking, packing or distributing machine. In actual practice for one reason or another, the receiving station sometimes fails to clear an article before the next is deposited and a pile-up occurs, often with severe damage to the main conveyor and the rejection of many damaged articles.

It is therefore my object to provide by this invention a conveyor clearing device for use in association with such conveyors which will detect a pile-up of articles, effect their clearance, and, if necessary, stop the conveyor so that substantial damage to the conveyor and/or the article is avoided.

It is also my object by this invention to effect the removal and forwarding of articles from conveyors in an efficient and faultless manner by providing conveyor clearing means to avoid the over loading of the receiving station.

Another object is to provide, by this invention, means whereby an article which has been misplaced on the conveyor may be detected before it reaches the receiving station in case it should cause unavoidable blockage of the conveyor clearing device.

Other objects and features of this invention will be apparent from the following description.

In accordance with my object, this invention basically comprises a conveyor clearing device for use in association with a main conveyor carrying a succession of articles, said device including: a beam-frame, at least one minor conveyor mounted on one end of said beam-frame and in line therewith, a minor conveyor drive assembly operable independently of the main conveyor, a pivotal mounting by which said beam-frame, minor conveyor and drive are pivotably supported and balanced about an axis transverse to said beam-frame, and a trip-switch associated with said beam-frame so that said trip-switch is operated by a predetermined angular movement of said beam-frame about said axis; the conveyor clearing device being arranged, when in use, so that the beam-frame is substantially in line with the main conveyor and so that articles carried by the main conveyor are deposited in succession upon the minor conveyor of the conveyor clearing device which removes them in turn from the main conveyor, said arrangement being such that a pile-up of articles on the minor conveyor will cause on angular movement of the balanced beam-frame about said axis thereby operating said trip switch, said trip-switch being connected to the main conveyor drive and/or to an alarm.

In order to further describe the invention particular examples of its application to a particular industrial problem will now be given by way of illustration only. The invention will be described with respect to the accompanying drawings in which:

FIGURE 1 is a plan view of the rear end of a main conveyor having a conveyor clearing device formed according to this invention associated therewith, the device being interposed between the rear end of the main conveyor and the forward end of a receiving station (part of which is shown);

FIGURES 2A and 2B, although on separate sheets, together illustrate a part-sectional elevation of the apparatus of FIGURE 1, the section being taken along the vertical plane A—A of FIGURE 1;

FIGURE 3 is a sectional elevation of portion of the conveyor clearing device illustrated in FIGURE 1, the section being taken along the vertical plane B—B of FIGURE 1;

FIGURE 4 is a plan view of the rear end of a modified main conveyor having a modified conveyor clearing device associated therewith;

The main conveyor of this example is one which is constructed so as to carry a succession of printed tin-plate sheets through a drying oven immediately after printing and just before the sheets are made into containers. It is essential that the sheets are not bent or damaged in any way during their handling since they will thereby be rendered unfit for use in the later stages of container manufacture. From the following description and the accompanying drawings it can be seen that, should a normal receiving station fail to remove each sheet from the conveyor before the next sheet is ready for removal, a pile-up will occur with consequent damage to the sheets and the conveyor forks.

Figure 1:
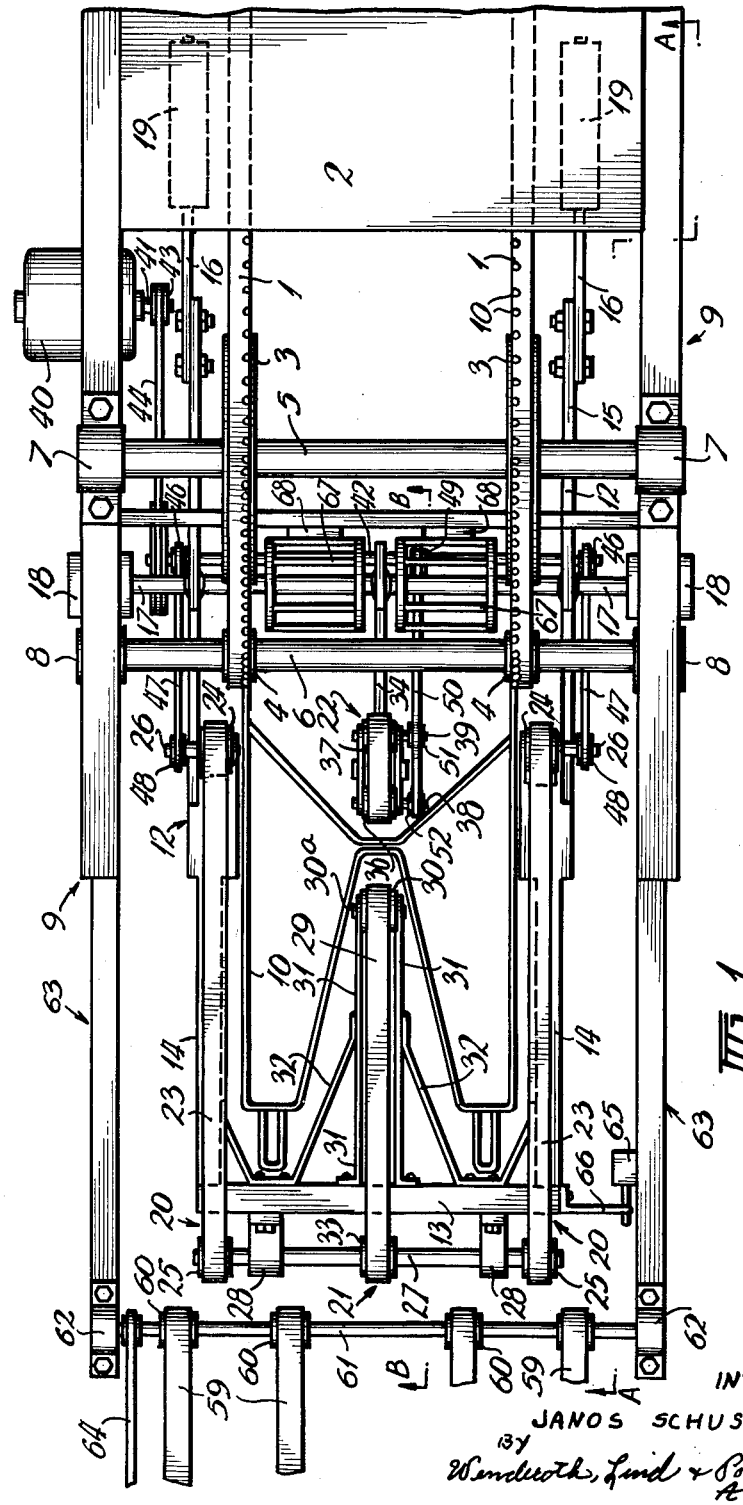
Figure 2A:
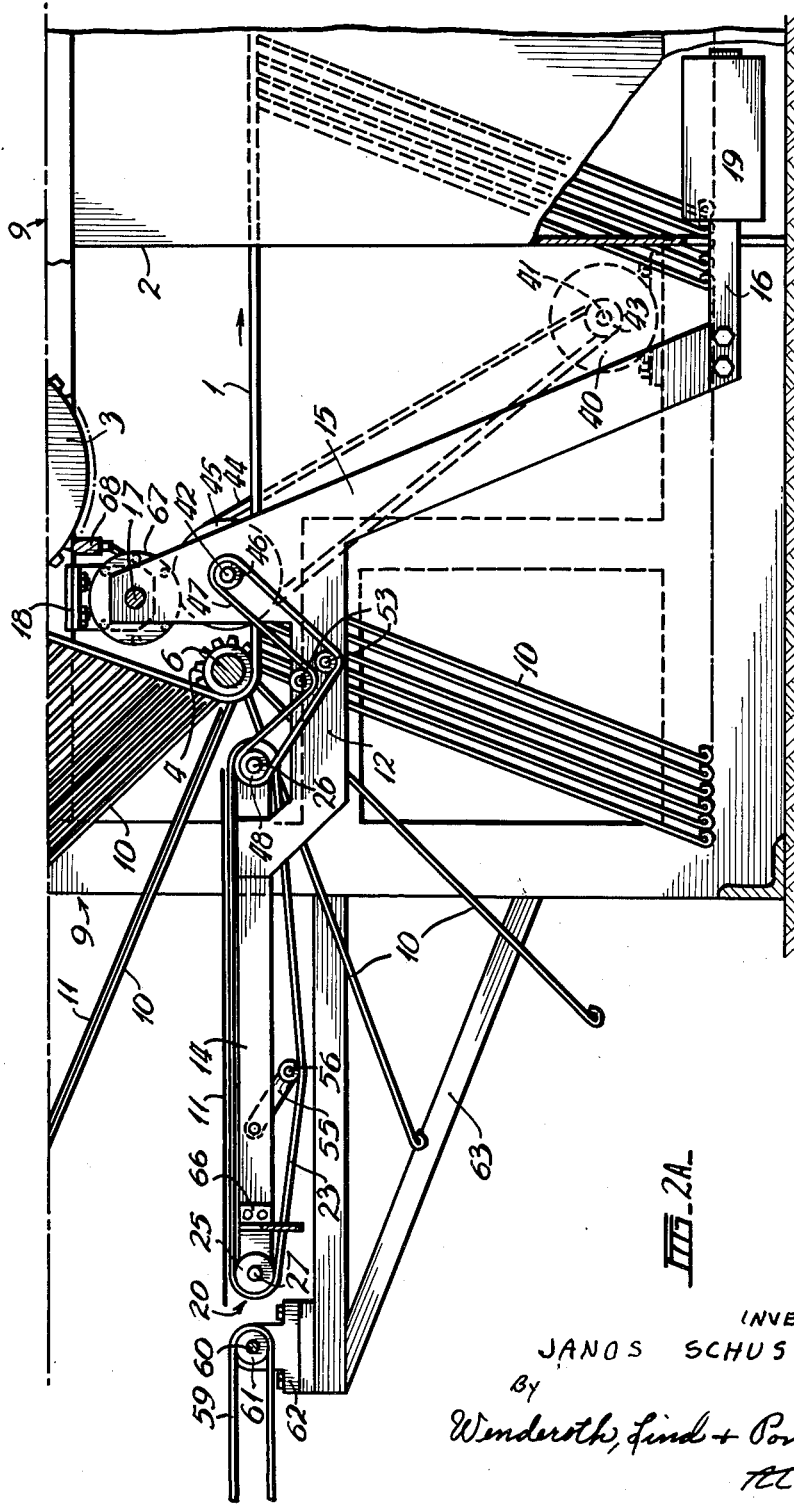

Referring more particularly to FIGURES 1, 2a and 2b of the drawings, the main conveyor is formed by the two parallel endless chains 1 which pass horizontally and longitudinally through the drying cabinet 2, the rear portion of each chain 1 being supported by, and passing around, the upper and lower pairs of idler sprockets 3 and 4 respectively. Each of the two pairs of idler sprockets (3 and 4) is mounted on a single transverse shaft, the pair of sprockets 3 being mounted on the shaft 5 and the pair of sprockets 4 on the shaft 6, both shafts (5 and 6) being journalled in suitable bearings 7 and 8 (respectively) affixed to the longitudinal members of the main conveyor frame 9. The main conveyor chains 1 normally pass in the direction of the arrows (see FIGURES 2a and 2b) so that the top conveyor run proceeds rearwardly and the bottom forwardly. Firmly secured to each pair of corresponding links of the conveyor chains 1 is a wire fork 10 which preferably is arranged not quite at right angles to the said links (see FIGURE 1), and it is between these forks 10 that the printed tin plate sheets 11 are interleaved (at the front or loading end of the main conveyor) and by which they are carried through the drying cabinet 2.

In the example illustrated in FIGURES 1, 2a and 2b of the accompanying drawings, the conveyor clearing device is situated immediately behind the main conveyor and consists basically of a beam-frame formed by the longitudinal beams 12 and the transom 13 which is secured horizontally across the rear ends of the beams 12. The beams 12 are located one on each side of the rear of the main conveyor chains 1 and, in this example, each is in the form of a Z (standing in a vertical plane), the upper and lower arms being substantially horizontal and extending rearwards and forwards (respectively). Thus, each beam 12 is composed of three parts, an upper substantially horizontal rear portion 14, a main portion 15, and a lower substantially horizontal forward portion 16. Actually in this example, part of the horizontal rear portion is formed integrally with the main portion 15 and it is therefore regarded as part of the main portion). The main portion 15 of the beam-frame 12 extends somewhat above the level of its rear portion 14 so as to form a lug whereby the beam-frame 12 may be suspended from the horizontal transverse shaft 17 which is journalled in the bearings 18 fixed to the sides of the conveyor frame 9.

The main beam portions 15 are firmly secured to the shaft 17 and, as can be seen from the drawings, the weights 19 (one secured to the forward end of each beam portion 16) can be arranged so that the conveyor clearing device is not only entirely supported by the shaft 17 but is also balanced thereabout so that the beam portions 14 and 16 are normally horizontal.

The conveyor clearing device of this example of the invention is provided with a minor conveyor comprising a total of four normally horizontal longitudinal conveyor runs, each run comprising an endless belt supported on and driven by front and rear pulleys, all the runs being mounted between the rear portions 14 of the beam-frame 12. Each of the two outer runs is denoted by the reference numeral 20 while the two inner runs are denoted by the numerals 21 and 22. Each of the outer runs 20 consists of an endless belt 23, a front driver pulley 24 and a rear driven pulley 25; the pulley 24 being mounted on the inner end of a horizontal transverse stub-axle 26 journalled in a forward extension of the beam portion 14, and the pulley 25 being fixed to the outer end of a horizontal transversely extending shaft 27 journalled in the bearings 28 attached to the transom 13.

On the other hand, the conveyor run 21 consists basically of an endless belt 29, a forward driven pulley 30 fixed to a shaft 30a which is journalled in the forward ends of the horizontal and longtiudinally extending brackets 31 (the rear ends of the brackets 31 being fixed to the center of the transom 13 and being braced in position by the V-braces 32), and the rear driver pulley 33 which is fixed to the center of the shaft 27.

The fourth conveyor run (22) which forms the minor conveyor of the clearing device consists basically of an endless belt 35 and a front driven pulley 37 and a rear driven pulley 36 mounted on the shafts 38 and 39 respectively, both of which shafts are journalled in a fork formed on the end of the member 34. Thus, it can be seen from the drawings that the tops of the four conveyor runs are at all times co-planar, the common plane normally being horizontal.

All the conveyor runs of the minor conveyor of the conveyor clearing device are driven from a single independent driving motor 40 which, in this example, is mounted on the main conveyor frame 9 and is positioned so that the normal movement of the device about the shaft 17 does not severely affect the V-belt (44) tension; otherwise it may be mounted on the rear portion 16 of the beam frame 12. The shaft 41 of the motor 40 is rotatably connected to an intermediate shaft 42 journalled at either end in suitable bearings provided in the portion 15 of the beam-frame 12 so as to lie parallel with the shaft 17 and so that each end projects outwardly of the corresponding beam portion 15, the drive connection being effected by a V-grooved motor pulley 43, a V-belt 44 and a V-grooved driven pulley 45 (the pulley 45 being mounted on the outer extremity of one end of the intermediate shaft 42). The intermediate shaft 42 is provided with three chain sprockets, the two outer-most sprockets 46 are situated outside the beam portions 15 and are connected by the chain 47 to the sprockets 48. Each sprocket 48 is connected to the outer end of one of the stub axles 26 the inner end of which is connected to the drive pulley 24 of the side conveyor runs 20. The endless belts 23 of the side conveyor runs 20 carry the drive to the shaft 27 which in turn drives the endless belt 29 of the conveyor run 21. The third sprocket 49 is mounted substantially in the center of the shaft 42 between the conveyor chains 1 and takes the chain 50 which passes around the sprockets 51 and 52 connected to the shafts 38 and 39 (respectively) of the fourth conveyor run 22.

In order to ensure that the chains 48 and 50 do not foul the sheets 11 as they are deposited upon the minor conveyor of the conveyor clearing device, these chains pass beneath pairs of idler rollers, the chain 48 passing beneath the rollers 53 fixed to the portion 15 of the beam-frame 12 and the chain 50 passing beneath the rollers 54 fixed to the member 34.

In order to maintain the correct tension of the belts 23 of the outer conveyor runs 20, a belt tensioning device is provided in association with each conveyor run. This device may simply comprise an arm 55 pivoted by its upper and rearmost end to the beam portion 14 and being supported by its lower and foremost end on the upper surface of the lower side of the belt 23 by the medium of the roller 56. An exactly similar arrangement is provided in connection with the endless belt 29 of the conveyor run 21 and consists of the pivoted arm 57 and the roller 58.

In this particular example, the receiving station is moved longitudinally rearwards in order to make room for the interposition of the conveyor clearing device between it and the main conveyor. Thus, the receiving station is immediately to the rear of the rearmost portion of the conveyor clearing device and simply constitutes the forward end of a conveyor arrangement in the same horizontal plane as the minor conveyor of the conveyor clearing device. The conveyor of the receiving station is composed of the four parallel longitudinal endless belts 59 which are mounted on the four pulleys 60 secured to the shaft 61 the ends of which are journalled in the bearings 62 which are mounted on the rearmost ends of a sub-frame 63 that is secured to the main frame 9.

The trip-switch 65 of this particular example is mounted on the inside of a side member of the sub-frame 63 and is operated by means of the trip-arm 66 associated with the beam portion 14 so that, when the conveyor clearing device moves downwardly about the shaft 17 and the beam portion 14 is lowered, the trip-switch 65 will be operated. It sometimes happens, in this type of main conveyor, that a badly misplaced sheet 11 will catch in the conveyor forks 10 and make it practically impossible for the conveyor clearing device to remove it from its fork before the next successive sheet is deposited thereon.

Although by the use of this invention a pile-up which results from such a contingency will not be serious, it is desirable to stop the main conveyor as soon as a badly misplaced sheet has been noticed. Therefore two paddle wheels 67 are mounted freely on the shaft 17, each wheel 67 is in the form of a squirrel-cage having a number of bars spaced around its periphery so that a badly misplaced sheet will, by contacting the bars as it moves towards the conveyor clearing device, cause the paddle wheels 67 to rotate. However, each paddle wheel 67 is associated with an additional trip-switch 68 which will be operated as soon as the paddle wheel 67 is moved. The trip-switch 68 may either be connected so as to stop the conveyor as soon as a misplaced sheet 11 is detected or it may be connected so as to give a suitable alarm.

Although the operation of the conveyor clearing device will be evident from the above description it may be desirable to now give a brief description of its function.

The main conveyor is run according to normal practice and the sheets 11 are interleaved with the forks 10 at the front of the conveyor and travel on the upper run through the drying cabinet 2 and over the sprocket wheels 3. Each sheet 11 is then laid separately and in turn on the minor conveyor of the conveyor clearing device which is being driven by the motor 40 so as to discharge the sheets 11 onto the receiving station in good time before the next sheet is laid thereon.

Should, however, for one reason or another the conveyor clearing device fail to discharge a sheet 11 on to the receiving station before the next successive sheet is deposited thereon, the next successive fork 10 will jam against the said sheet 11 and be prevented from passing below the surface of the minor conveyor. But, in accordance with this invention, the additional weight of the extra sheet 11 and the pressure of the next successive fork 10 is sufficient to move the entire conveyor clearing device in a counterclockwise manner around the shaft 17. After a slight movement of the conveyor clearing device the arm 66 will trip the trip-switch 65 and stop the main conveyor while the minor conveyor continues to run and removes the sheets from between the forks and deposits them on the receiving station conveyor. However, if the first sheet 11 is badly situated and/or the main conveyor overruns after being switched off, the conveyor clearing device will move through a much greater angle and the sheets 11 held thereon will be deposited on the floor below the receiving station the device then swings back into its normal position.

Figure 5:
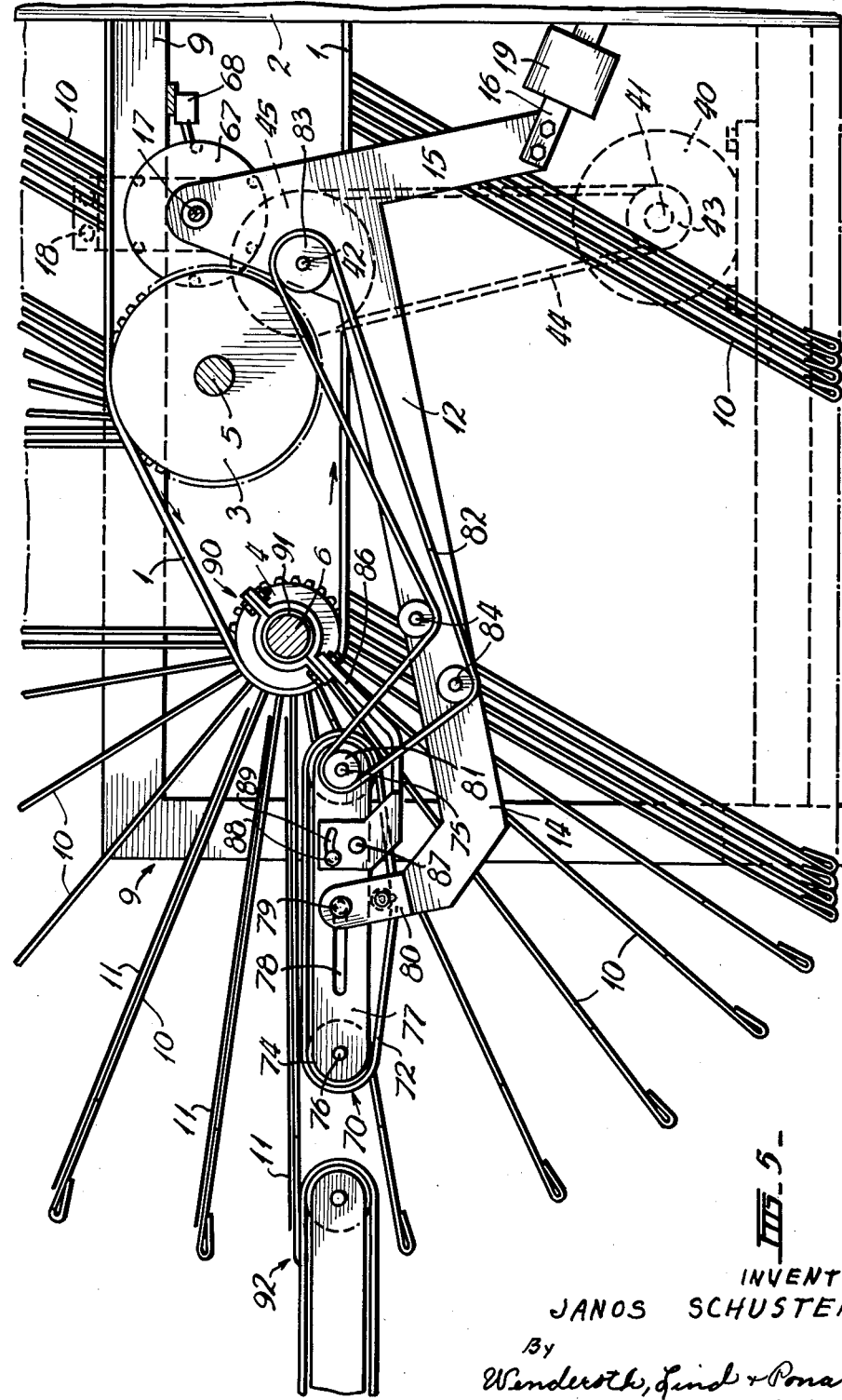
FIGURE 5 is a part-sectional elevation of the apparatus of FIGURE 4 as viewed along the section plane C—C.

FIGURES 4 and 5 of the accompanying drawings illustrate a very similar conveyor to that described with respect to FIGURES 1, 2a and 2b and, therefore, the corresponding reference numerals will be used where applicable in the following description.

The main conveyor of this example is for exactly the same purpose as the main conveyor of the first example the only difference being that the two conveyors represent different models commonly used in the art the principle difference lying in the shape of the forks 10, the forks of this conveyor being closed at the top. Referring to the drawings, the two parallel conveyor chains 1 once again pass through the drying cabinet 2 and around the pairs of idler sprockets 3 and 4 which are mounted on the transverse shafts 5 and 6 (respectively), the shafts being journalled in suitable bearings 7 and 8 fixed to the frame 9. The forks 10 are again attached to corresponding links of the conveyor chains 1 as previously described, and the tin-plate sheets 11 are also inter-leaved with them as before.

However, the beam-frame 12 of this conveyor clearing device is considerably modified, even though it still consists basically of beams mounted on either side of the main conveyor and supported by the shaft 17. The normal position of the forward portion 14 of each beam-frame 12 is no longer substantially horizontal, nevertheless it is arranged so that the conveyor runs of the minor conveyor are horizontal. The rear portion 16 of the beam-frame 12 also lies out of the horizontal but the weight 19 is attached thereto as previously described and for the same purpose. The shaft 17 is again journalled in the bearings 18 which are fixed to the frame 9 and it also carries the two paddle wheels 67 which are associated with the trip-switches 68 for the purpose previously described. Once again the drive motor 40 is mounted on the frame 9 and its shaft 41 is coupled to the intermediate shaft 42 by means of the pulleys 43 and 45 and the V-belt 44.

Since the majority of the remainder of the conveyor clearing device of this example is somewhat different from that previously described, new reference numerals will now be used.

The minor conveyor of the conveyor clearing device consists of three independent substantially identical conveyor runs 70, the conveyor runs comprising two outside runs and one central run. Each of the conveyor runs 70 consists of an endless belt 72 which passes over a forward drive pulley 73 and a rear driven pulley 74 mounted on the shafts 75 and 76 (respectively) which are journalled in the corresponding ends of two parallel longitudinal members 77. The members 77 have a longitudinal slot 78 formed in their sides through which the pin 79 passes transversely so that the members 77 (and therefore the conveyor run 70) is pivoted thereabout, the pin 79 being located in a fork 80 formed on the rearmost end of the portion 14 of the beam-frame 12.

One end of the shaft 75 associated with the driver pulley 73 of each conveyor run is provided with a sprocket 81 around which a chain 82 passes rotatably connecting the shaft 75 to a sprocket 83 provided on the intermediate shaft 42.

In this example, as in the previous example, it is desirable to direct the chain 82 beneath two idler sprockets 84 so as to reduce the risk of the chain fouling the sheets 11. In this example, of course, the central conveyor run is not attached to either of the outside beams 12 by a transom (since the forks 10 are closed) but is independently secured to the shaft 17 by means of the member 85.

The movement of the minor conveyors 70 associated with the conveyor clearing device of this example is modified so as to correspond more exactly with the path of the forks 10 as they pass around the idler sprockets 4 so that fouling of the forks 10 by the runs 70 is prevented, even when the clearing device is fully displaced. This is achieved by pivotally attaching the members 77 to the shaft 6 by means of the links 86. Each link 86 is pivoted by the pin 87 to the members 77, but the pivotal movement of the members 77 with respect to the member 86 is limited by the movement permitted, the pin 88 in the arcuate slot being formed in the link 86. The forward end of the link 86 is attached to a split bearing 90 which is secured about the shaft 6 so that said shaft is free to rotate therein. Each of the split bearings 90 is located axially with respect to the shaft 6 by means of the collar 91.

Thus, although the second example of the conveyor clearing device operates in a substantially identical manner to the first example when it is in normal operation, when a pile up occurs the congestion is relieved in a somewhat different way. The difference, of course, lies in the manner in which the minor conveyor is allowed to move around shaft 6 and still tip on the axis of the pin 79. It is possible by this means to quickly deposit the plates 11 which have been involved in a pile-up on the floor, or in a different position from the plates which are passed normally over the conveyor clearing device to the receiving station generally indicated by the numeral 92.

Although I have described two examples of my invention in particular terms, I do not wish to strictly limit myself to either since further alterations and additions may be made without departing from the scope of the invention which is defined in the following claims. For example, it would be possible to balance the links 86 and the runs 70 (of FIGURES 4 and 5) about the axis of the shaft 6 instead of the shaft 17.

The claims defining the invention are as follows:

1. A conveyor clearing device for use in association with a main substantially horizontal sheet conveyor having a plurality of parallel endless chains passing around front and rear sprockets or rollers so that the top chain lengths move toward the rear sprockets, said chains having affixed thereto and standing up therefrom a plurality of conveyor forks between which a succession of sheets may be interleaved and by which said sheets may be carried to the rear of the main conveyor, said conveyor clearing device comprising a beam-frame, at least one minor endless belt conveyor mounted on and in line with said beam-frame, said minor conveyor having a length not less than substantially half of the fork length, a drive assembly connected to said minor conveyor and operable independently of said main conveyor, a pivotal mounting situated forwardly of said minor conveyor on which said beam-frame is pivotally supported about a transverse axis, at least one balance weight arranged on the forward end of the beam-frame on the opposite side of said axis from said minor conveyor so that said beam-frame and minor conveyor are balanced about said axis and so that the minor conveyor is normally maintained in a substantially horizontal position, and a trip-switch mounted adjacent said beam-frame so as to be operated by a predetermined downward movement of said beam-frame and minor conveyor from the normal position and being adapted to be connected to the main conveyor drive to disconnect the main conveyor drive to stop the main conveyor when said trip switch is tripped, the beam-frame and minor conveyor being in line with said main conveyor and immediately to the rear thereof, whereby each sheet conveyed by the main conveyor is laid by its associated fork on the minor conveyor which moves it rearwardly so that it is clear of the main conveyor fork path before the next succeeding fork lays its associated sheet thereon, the minor conveyor being arranged so that the forks may continue their normal motion about the rear sprockets but so that the sheets are caught thereby and cleared, said minor conveyor retaining its normal horizontal position during normal operation and being swung downwardly about said axis so that the trip-switch is tripped should said minor conveyor fail to clear a sheet before the next succeeding fork or forks descend thereon, the swinging movement being caused by the pressure of the next succeeding fork or forks on the previous uncleared sheet.

2. A conveyor clearing device as claimed in claim 1 wherein the axis about which the beam-frame is mounted coincides with the axis of the rear sprockets of the main conveyor when the device is in use.

3. A conveyor clearing device as claimed in claim 1 wherein said pivotal mounting comprises a transverse shaft on which the beam-frame is pivotally mounted and supported about said transverse axis, said shaft passing transversely through the loops of the main conveyor chains close to the rear end thereof, so that when the beam-frame pivots, the path of the minor conveyor about the shaft is similar to the path of the forks of the main conveyor as they pass downwards below the horizontal plane.

4. A conveyor clearing device according to claim 3 in which said minor conveyor comprises at least two parallel co-planar endless conveyor runs secured to the beam-frame and driven by said minor conveyor drive, the conveyor runs being arranged one on either side of the path of the forks around the rear sprockets and each having a length not substantially less than that of the forks.

5. A conveyor clearing device according to claim 3 in which said minor conveyor comprises at least three parallel co-planar conveyor runs laterally spaced from each other and secured to the beam-frame and driven by said minor drive, said beam-frame having a transom on the rear end thereof and each run being supported at its rear end on said transom, whereby when the main conveyor has two pronged forks, there is one run on either side of the forks and one between the prongs thereof and the forks pass forwardly of the transom.

6. A conveyor clearing device as claimed in claim 5 in which the minor conveyor further comprises a fourth independently mounted conveyor run in line and co-planar with the central conveyor run but spaced longitudinally therefrom and being between the central conveyor run and the main conveyor, said fourth run being connected to the said transverse shaft so as to be movable thereabout with the rest of the minor conveyor and being connected to the minor conveyor drive, the fourth run being positioned so that, when the device is in use, the back of the forks may pass between it and the central minor conveyor run.

7. A conveyor clearing device as claimed in claim 1 in which said minor conveyor comprises three co-planar conveyor runs laterally spaced from each other and driven by the minor conveyor drive, each run being independently secured to the said transverse shaft, independently driven from said drive and being in line with the beam-frame, whereby when the conveyor has closed forks one run lies on either side of the forks and the third lies between the sides of the forks but in front of the closed ends when the forks are horizontal at the rear of the main conveyor.

8. A conveyor clearing device according to claim 7 wherein each conveyor run is pivotally and longitudinally slidably attached to the rear ends of the beam-frame, and wherein at least the central run of the minor conveyor is pivotally attached to the shaft on which a pair of said rear sprockets of the main conveyor are mounted, so that the movement of said central run downward from the horizontal position closely corresponds to the movements of the forks over the same path, thereby avoiding contact between the closed forks and said run.

9. A conveyor clearing device according to claim 1, and a transverse shaft arranged immediately below the top main conveyor chain lengths, and at least one squirrel cage paddle wheel freely rotatably mounted on said transverse shaft, whereby when the device is in use, any misplaced articles borne by the conveyor will be likely to come into contact with the paddle wheel and effect the rotation thereof, and a second trip-switch operable by said paddle wheel upon the rotation of the paddle wheel to stop the main conveyor and/or give an alarm.

References Cited in the file of this patent

UNITED STATES PATENTS 2,830,690    Macoy et al. _____ Apr. 15, 1958